(12) United States Patent
Fan et al.

(10) Patent No.: US 10,284,093 B2
(45) Date of Patent: May 7, 2019

(54) POWER CONVERSION APPARATUS AND METHOD FOR CONFIGURING THE SAME

(71) Applicant: ZTE CORPORATION, Guangdong (CN)

(72) Inventors: Jie Fan, Guangdong (CN); Jianping Zhou, Guangdong (CN); Guoxian Lin, Guangdong (CN)

(73) Assignee: ZTE Corporation, Guangdong (CN)

( * ) Notice: Subject to any disclaimer, the term of this patent is extended or adjusted under 35 U.S.C. 154(b) by 0 days.

(21) Appl. No.: 15/739,442

(22) PCT Filed: Oct. 30, 2015

(86) PCT No.: PCT/CN2015/093447
§ 371 (c)(1),
(2) Date: Dec. 22, 2017

(87) PCT Pub. No.: WO2016/206269
PCT Pub. Date: Dec. 29, 2016

(65) Prior Publication Data
US 2018/0183335 A1     Jun. 28, 2018

(30) Foreign Application Priority Data
Jun. 24, 2015 (CN) .......................... 2015 1 0355472

(51) Int. Cl.
*H02M 3/158* (2006.01)
*H02M 1/42* (2007.01)
(Continued)

(52) U.S. Cl.
CPC ....... *H02M 3/1584* (2013.01); *H02M 1/4225* (2013.01); *H02M 7/21* (2013.01);
(Continued)

(58) Field of Classification Search
CPC ... H02M 1/4225; H02M 3/1584; H02M 7/219
See application file for complete search history.

(56) References Cited

U.S. PATENT DOCUMENTS

| 6,671,188 B2 | 12/2003 | Morita |
| 2003/0043600 A1 | 3/2003 | Morita |

(Continued)

FOREIGN PATENT DOCUMENTS

| CN | 101527520 A | 9/2009 |
| CN | 102055348 A | 5/2011 |

(Continued)

OTHER PUBLICATIONS

International Search Report dated Mar. 4, 2016 for International Application No. PCT/CN2015/093447, 7 pages.
(Continued)

*Primary Examiner* — Jue Zhang
*Assistant Examiner* — Bart Iliya
(74) *Attorney, Agent, or Firm* — Knobbe, Martens, Olson & Bear, LLP (57) ABSTRACT

The present disclosure discloses a power conversion apparatus and a method for configuring the same. The power conversion apparatus includes a boost unit and at least two power conversion units; each of the power conversion units has two input ends; an input end of the boost unit is connected with one end of an alternating-current power supply, and an output end of the boost unit is connected with one input end of a first power conversion unit of the plurality of power conversion units; one input end of a last power conversion unit of the plurality of power conversion units is connected with the other end of the alternating-current power supply; and the input ends of the plurality of power
(Continued)

conversion units are connected in series, and the output ends of the plurality of power conversion units are connected in parallel.

18 Claims, 8 Drawing Sheets

(51) Int. Cl.
*H02M 7/219* (2006.01)
*H02M 7/21* (2006.01)

(52) U.S. Cl.
CPC ............ *H02M 7/219* (2013.01); *Y02B 70/126* (2013.01); *Y02P 80/112* (2015.11)

(56) References Cited

U.S. PATENT DOCUMENTS

| | | | | |
|---|---|---|---|---|
| 2012/0268084 | A1* | 10/2012 | Wang | H02M 1/4225 323/208 |
| 2013/0134935 | A1* | 5/2013 | Maitra | B60L 11/185 320/109 |
| 2014/0153294 | A1* | 6/2014 | Deboy | H02M 3/33569 363/21.04 |
| 2014/0313789 | A1* | 10/2014 | Dujic | H02M 3/33507 363/21.01 |
| 2016/0144723 | A1* | 5/2016 | Guggisberg | B60L 11/1801 191/7 |
| 2016/0236580 | A1* | 8/2016 | Hou | B60L 11/1811 |
| 2016/0380531 | A1* | 12/2016 | Kataoka | H02M 1/4225 323/210 |

FOREIGN PATENT DOCUMENTS

| | | |
|---|---|---|
| CN | 102291019 A | 12/2011 |
| CN | 103269177 A | 8/2013 |
| CN | 103986344 A | 8/2014 |
| CN | 104539187 A | 4/2015 |
| EP | 1289109 A2 | 3/2003 |

OTHER PUBLICATIONS

Written Opinion of the International Searching Authority dated Mar. 4, 2016 for International Application No. PCT/CN2015/093447, 3 pages.

* cited by examiner

POWER CONVERSION APPARATUS AND METHOD FOR CONFIGURING THE SAME

CROSS REFERENCE TO RELATED APPLICATIONS

This application is the U.S. National Phase Application under 35 U.S.C. § 371 of International Application No. PCT/CN2015/093447 filed on Oct. 30, 2015, designating the U.S. and published as WO 2016/206269 A1 on Dec. 29, 2016, which claims the benefit of Chinese Patent Application No. 201510355472.3, filed on Jun. 24, 2015, both of which are hereby incorporated by reference in their entirety.

TECHNICAL FIELD

The present disclosure relates to the field of power conversion, and specifically, to a power conversion apparatus and a method for configuring the same.

BACKGROUND

With an increasing demand for power density and efficiency of a power converter, an existing technology may not meet the demand since there is not a breakthrough in a converter topology technology.

A single power converter adopts a two-stage structure. A power factor correction (PFC) unit implements a pre-regulated voltage for alternating current-direct current (AC-DC). A DC-DC conversion unit converts the pre-regulated voltage into a required output voltage. In this way, a stress of a switching device is relatively high, and a volume of a magnetic device is large as well, resulting in no advantage in terms of efficiency and volume in medium and high-power applications. For this reason, a common practice is to realize multiphase parallel connection on the PFC unit or DC-DC unit, which may reduce the stress of the device and the volume of the magnetic part. Thus, the efficiency and heat dissipation are improved, and meanwhile, input and output current ripples are reduced by utilizing interleaved control. Alternatively, the related technologies, such as employing interleaved PFC, employing coupled inductance, a DC-DC isolation transformer employing a matrix transformer, etc., are to some extent contribute to improving the efficiency and the power density, but they may not effectively reduce the volume of the magnetic part and the stress of the switching device, and may not achieve automatic current sharing, in which an additional current-sharing control is required to be added and a control complexity of a system is also increased.

SUMMARY

A problem to be solved by the present disclosure is to provide a power conversion apparatus and a method for configuring the same, so as to solve problems of large volume and stress and complicated control of the existing power converter.

In order to solve the above technical problems, the present disclosure provides a power conversion apparatus. The power conversion apparatus includes a boost unit and at least two power conversion units, wherein each of the power conversion units has two input ends and two output ends; an input end of the boost unit is connected with one end of an alternating-current power supply, and an output end of the boost unit is connected with one input end of a first power conversion unit of the at least two power conversion units; one input end of a last power conversion unit of the at least two power conversion units is connected with the other end of the alternating-current power supply; and the input ends of the at least two power conversion units are connected in series, and the output ends of the at least two power conversion units are connected in parallel.

In one embodiment of the present disclosure, each of the power conversion units includes a first conversion subunit and a second conversion subunit respectively with two input ends and two output ends; the two output ends of the first conversion subunit of each power conversion unit are respectively connected with the two input ends of the second conversion subunit; the two output ends of the second conversion subunits of the power conversion units are respectively connected in parallel; and the input ends of the first conversion subunits of the power conversion units are sequentially connected in series; one input end of the first conversion subunit of the first power conversion unit is connected with the output end of the boost unit; and one input end of the first conversion subunit of the last power conversion unit is connected with the other end of the alternating-current power supply.

In one embodiment of the present disclosure, the first conversion subunit is a non-isolated alternating current-direct current (AC-DC) conversion subunit or a non-isolated DC-DC conversion subunit, and the second conversion subunit is an isolated DC-DC conversion subunit.

In one embodiment of the present disclosure, when the first conversion subunit is the non-isolated AC-DC conversion subunit, the non-isolated AC-DC conversion subunit is an H-bridge circuit conversion subunit or a bidirectional switch H-bridge circuit conversion subunit; when the first conversion subunit is the non-isolated DC-DC conversion subunit, the non-isolated DC-DC conversion subunit is a half-bridge circuit conversion subunit; and the isolated DC-DC conversion subunit is an LLC half-bridge circuit conversion subunit or an LLC full-bridge circuit conversion subunit.

In one embodiment of the present disclosure, when the first conversion subunit is the non-isolated DC-DC conversion subunit, the power conversion apparatus further includes a rectification unit configured to convert an alternating current into a direct current, wherein the one input end of the first conversion subunit of the first power conversion unit is connected with the one end of the alternating-current power supply through the boost unit and the rectification unit; and the one input end of the first conversion subunit of the last power conversion unit is connected with the other end of the alternating-current power supply through the rectification unit.

In one embodiment of the present disclosure, each of the power conversion units includes a third conversion subunit, and two output ends of the third conversion subunits of the power conversion units are respectively connected in parallel; and input ends of the third conversion subunits of the power conversion units are sequentially connected in series; one input end of the third conversion subunit of the first power conversion unit is connected with the output end of the boost unit; and one input end of the third conversion subunit of the last power conversion unit is connected with the other end of the alternating-current power supply.

In one embodiment of the present disclosure, the third conversion subunit is an isolated AC-DC conversion subunit.

In one embodiment of the present disclosure, the boost unit includes at least one inductor.

In order to solve the above problems, the present disclosure further provides a method for configuring a power conversion apparatus. The power conversion apparatus includes a boost unit and at least two power conversion units, each of the power conversion units having two input ends and two output ends. The method includes: connecting an input end of the boost unit with one end of an alternating-current power supply, and connecting an output end of the boost unit with one input end of a first power conversion unit of the at least two power conversion units; connecting one input end of a last power conversion unit of the at least two power conversion units with the other end of the alternating-current power supply; and connecting the input ends of the at least two power conversion units in series and the output ends of the at least two power conversion units in parallel.

The present disclosure has beneficial effects as follows.

The present disclosure provides a power conversion apparatus and a method for configuring the same. The power conversion apparatus includes a boost unit and at least two power conversion units; each of the power conversion units has two input ends; an input end of the boost unit is connected with one end of an alternating-current power supply, and an output end of the boost unit is connected with one input end of a first power conversion unit of the plurality of power conversion units; one input end of a last power conversion unit of the plurality of power conversion units is connected with the other end of the alternating-current power supply; and the input ends of the plurality of power conversion units are connected in series, and the output ends of the plurality of power conversion units are connected in parallel. Thus, the voltage stress and the current stress on the switching device may be 1/n times those of the existing power conversion apparatus, so that switching and conduction losses may be reduced. Under the same ripple condition, an input inductance of a PFC unit is significantly reduced, thereby reducing the volume of the inductor and increasing the power density. Meanwhile, the structure also makes the power conversion apparatus of the present disclosure have an automatic current sharing function and control on the power conversion apparatus be relatively simple and reliable.

DETAILED DESCRIPTION

In the present disclosure, a voltage stress and a current stress of a switching device may be reduced by connecting input ends of a plurality of power conversion units of a power conversion apparatus in series and connecting output ends thereof in parallel, so as to reduce switching and conduction losses of the switching device; and under the same ripple condition, an input inductance of a PFC unit is significantly reduced, a volume of the inductor is decreased, and the power density is increased; and meanwhile, such a structure also has an automatic current sharing function, and control on the structure is relatively simple.

Figure 1:
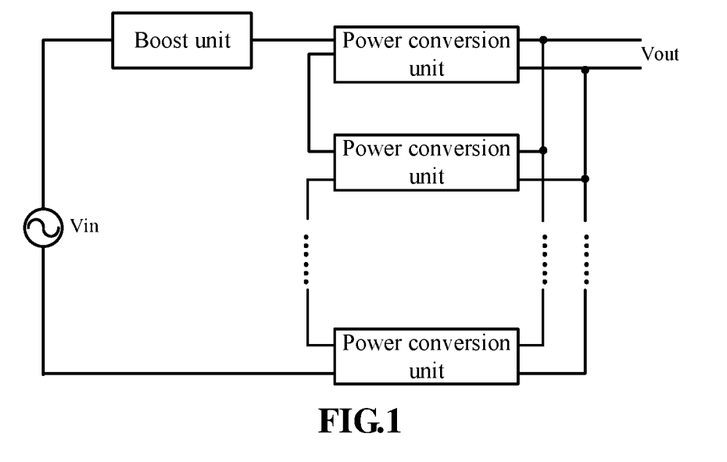
FIG. 1 is a schematic diagram one of a structure of a power conversion apparatus according to an embodiment of the present disclosure.

As shown in FIG. 1, the power conversion apparatus shown in the embodiment includes a boost unit and at least two power conversion units. Each of the power conversion unit has two input ends. An input end of the boost unit is connected with one end of an alternating-current power supply and an output end of the boost unit is connected with one input end of a first power conversion unit of the plurality of power conversion units. One input end of the last power conversion unit of the plurality of power conversion units is connected with the other end of the alternating-current power supply. The input ends of the plurality of power conversion units are connected in series, and output ends thereof are connected in parallel. That is, with respect to a stage of converting an alternating current into a direct current, the embodiment can make a voltage stress and a current stress on a switching device be 1/n times those of the existing power conversion apparatus, so that switching and conduction losses can be reduced. Moreover, under the same ripple condition, an input inductance of a PFC unit is decreased significantly, and then the volume of the inductor can be reduced, and the power density is increased. Meanwhile, the power conversion apparatus can also have an automatic current sharing function and control thereon is relatively simple and reliable.

In an embodiment, each of the power conversion units in the embodiment has two input ends and two output ends.

In an example one of the embodiment, each of the power conversion units includes a first conversion subunit with two input ends and two output ends and a second conversion subunit with two input ends and two output ends respectively.

The two output ends of the first conversion subunit of each power conversion unit are respectively connected with the two input ends of the second conversion subunit.

The two output ends of the second conversion subunits of the power conversion unit are respectively connected in parallel.

The input ends of the first conversion subunits of the power conversion units are sequentially connected in series. One input end of the first conversion subunit of the first power conversion unit and one input end of the first conversion subunit of the last power conversion unit are connected with two ends of the alternating-current power supply, respectively.

In the example one, the input end of the first conversion subunit of the first power conversion unit may be connected with the alternating-current power supply through the boost unit. In the example, the boost unit may specifically employ various boost devices or circuits. It will be exemplarily illustrated by using an inductor L as an example.

In the example one, the first conversion subunit may be a non-isolated AC-DC conversion subunit or a non-isolated DC-DC conversion subunit, and the second conversion subunit may be an isolated DC-DC conversion subunit. When the first conversion subunit is the non-isolated AC-DC conversion subunit, the non-isolated AC-DC conversion subunit may be an H-bridge circuit conversion subunit or a bidirectional switch H-bridge circuit conversion subunit. When the first conversion subunit is the non-isolated DC-DC conversion subunit, the non-isolated DC-DC conversion subunit may be a half-bridge circuit conversion subunit.

In the example one, the isolated DC-DC conversion subunit may be an LLC half-bridge circuit conversion subunit or an LLC full-bridge circuit conversion subunit. The LLC may be a series-parallel resonant converter.

In the example one, when the first conversion subunit is the non-isolated DC-DC conversion subunit, the power conversion apparatus may further include a rectification unit. The input end of the first conversion subunit of the first power conversion unit is connected with the one end of the alternating-current power supply through the boost unit and the rectification unit. The input end of the first conversion subunit of the last power conversion unit is connected with the other end of the alternating-current power supply through the rectification unit.

In the following, several cases in the above example one will be illustrated in conjunction with several specific structures.

Figure 2:
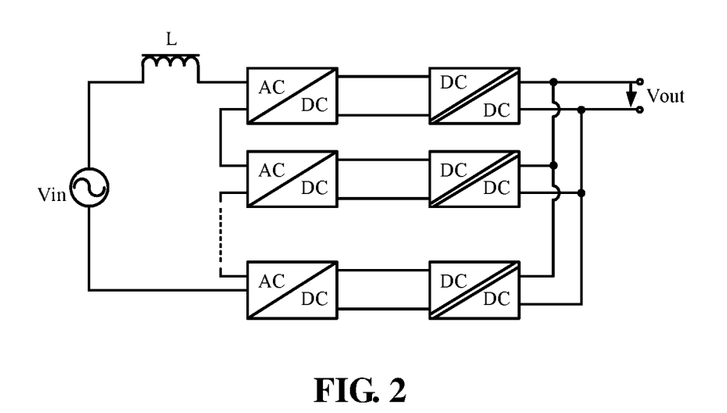
FIG. 2 is a schematic diagram two of a structure of a power conversion apparatus according to an embodiment of the present disclosure.

As shown in FIG. 2, the power conversion apparatus shown in the FIG. 2 includes N power conversion units. Each of the power conversion units may include a first conversion subunit that is a non-isolated AC-DC conversion subunit (i.e., an upfront voltage pre-regulation unit), and a second conversion subunit that is an isolated DC-DC conversion subunit. The boost unit may be a boost inductor. The specific connection manner thereof is as follows.

One end of an input alternating-current power supply (Vin) is connected with one end of the boost inductor L. One input end of a first non-isolated AC-DC conversion subunit of a first power conversion unit is connected with the other end of the boost inductor L. The other input end of the first non-isolated AC-DC conversion subunit is connected with one input end of a second non-isolated AC-DC conversion subunit, that is, the input ends of the first non-isolated AC-DC conversion subunit and the second non-isolated AC-DC conversion subunit are connected in series. The other input end of the second non-isolated AC-DC conversion subunit is connected with one input end of a third non-isolated AC-DC conversion subunit, that is, the input ends of the second non-isolated AC-DC conversion subunit and the third non-isolated AC-DC conversion subunit are also connected in series, and so on, input ends of a $(N-1)^{th}$ non-isolated AC-DC conversion subunit and a $N^{th}$ non-isolated AC-DC conversion subunit are also connected in series. The other input end of the $N^{th}$ non-isolated AC-DC conversion subunit (i.e., the last non-isolated AC-DC conversion subunit) is connected with the other end of the input alternating-current power supply. An output voltage signal of each non-isolated AC-DC conversion subunit is used as an input of each isolated DC-DC conversion subunit. Two output ends of various isolated DC-DC conversion subunits are respectively connected in parallel, i.e., each of the isolated DC-DC conversion subunits has a first output end and a second output end, all first output ends of all the isolated DC-DC conversion subunits are connected together and all second output ends of all the isolated DC-DC conversion subunits are connected together.

Figure 3:
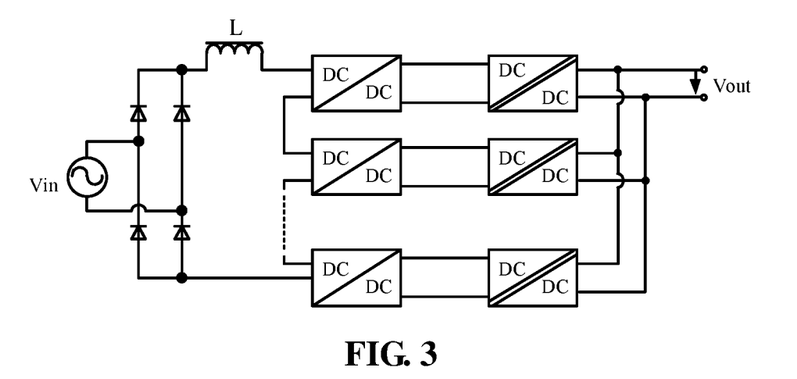
FIG. 3 is a schematic diagram three of a structure of a power conversion apparatus according to an embodiment of the present disclosure.

With reference to FIG. 3, the power conversion apparatus shown in FIG. 3 includes N power conversion units. Each power conversion unit may include a first conversion subunit that is a non-isolated DC-DC conversion subunit, and a second conversion subunit that is an isolated DC-DC conversion subunit. A boost unit may be a boost inductor. Each power conversion unit may further include an input rectification unit. The specific connection manner thereof is as follows. Differences from the connection as shown in FIG. 2 lies in the followings.

Two input ends of the input alternating-current power supply are respectively connected to midpoints of two rectification bridge arms of the rectification unit. One output end of the rectification bridges of the rectification unit is connected with one end of the boost inductor L. The other end of the boost inductor L is connected with one input end of the first non-isolated DC-DC conversion subunit, the other input end of the first non-isolated DC-DC conversion subunit is connected with one input end of the second non-isolated DC-DC conversion subunit, the other input end of the second non-isolated DC-DC conversion subunit is connected with one input end of the third non-isolated DC-DC conversion subunit, and so on, one input end of the $(N-1)^{th}$ non-isolated DC-DC conversion subunit is connected with one input end of the $N^{th}$ non-isolated DC-DC conversion subunit, and the other input end of the $N^{th}$ non-isolated DC-DC conversion subunit is connected with the other output end of the rectification bridges of the rectification unit. That is to say, the series connection of the input ends of the non-isolated DC-DC conversion subunits is the same as the series connection of the input ends of the non-isolated AC-DC conversion subunits shown in FIG. 2, the input end of the first non-isolated DC-DC conversion subunit is connected with the input end of the second non-isolated DC-DC conversion subunit in series, and so on. An output signal of each non-isolated DC-DC conversion subunit is sent into a filter capacitor. The connection manner of the isolated DC-DC conversion subunits is the same as that shown in FIG. 2, which will not be repeated here.

The non-isolated AC-DC conversion subunit shown in FIG. 2 may be an H-bridge circuit conversion subunit or a bidirectional switch H-bridge circuit conversion subunit. It will be exemplarily described below in conjunction with specific circuit structures respectively.

Figure 4:
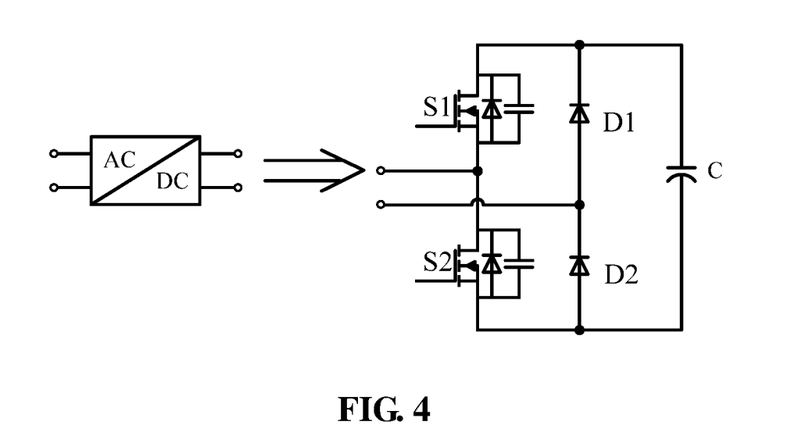
FIG. 4 is a schematic diagram one of a structure of a non-isolated AC-DC conversion subunit according to an embodiment of the present disclosure.

When the non-isolated AC-DC conversion subunit is specifically an H-bridge circuit conversion subunit, one example of a specific structure of the non-isolated AC-DC conversion subunit is shown in FIG. 4, which shows a circuit diagram of an H bridge. A source (S) of a Metal Oxide Semiconductor (MOS) transistor S1 of a first bridge arm is connected with a drain (D) of a MOS transistor S2, and an anode of a diode D1 of a second bridge arm is connected with a cathode of a diode D2. Midpoints of the first bridge arm and the second bridge arm respectively serve as two input ends of the non-isolated AC-DC conversion subunit. A drain (D) of the MOS transistor S1 is connected with a cathode of the D1 and a positive end of an output capacitor which may serve as a positive end of the output, and a source (S) of the MOS transistor S2 is connected with an anode of the diode D2 and a negative end of the output capacitor C which may serve as a negative end of the output.

Figure 5:
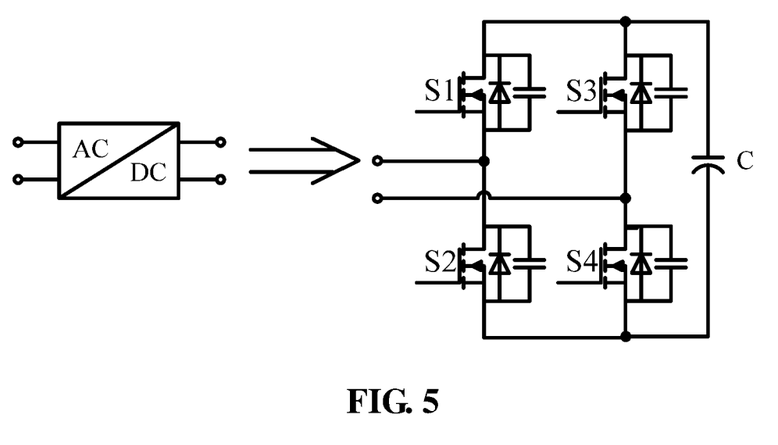
FIG. 5 is a schematic diagram two of a structure of a non-isolated AC-DC conversion subunit according to an embodiment of the present disclosure.

When the non-isolated AC-DC conversion subunit is specifically an H-bridge circuit conversion subunit, another specific example of a specific structure of the non-isolated AC-DC conversion subunit is shown in FIG. 5, which shows another circuit diagram of the H-bridge. A difference from FIG. 4 lies in that the above diodes D1 and D2 are replaced by MOS transistors S3 and S4.

Figure 6:
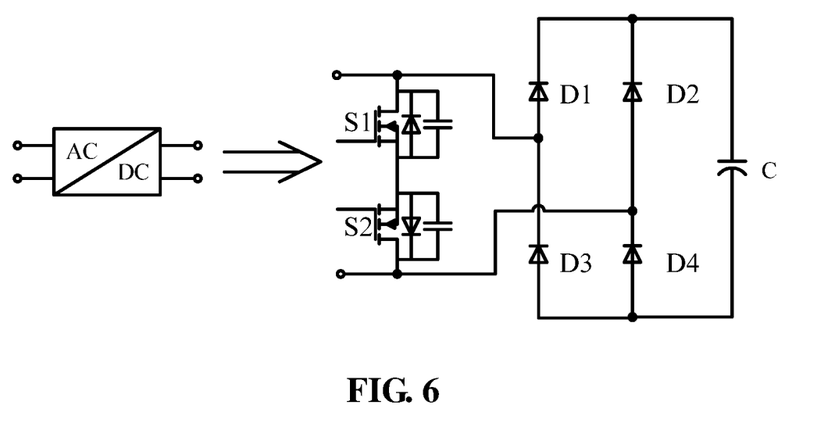
FIG. 6 is a schematic diagram three of a structure of a non-isolated AC-DC conversion subunit according to an embodiment of the present disclosure.

When the non-isolated AC-DC conversion subunit is specifically a bidirectional switch H-bridge circuit conversion subunit, one example of a specific structure of the non-isolated AC-DC conversion subunit is shown in FIG. 6, which shows a circuit diagram of a bidirectional switch H bridge. A drain (D) of a MOS transistor S1 serves as one input end, and the drain (D) of the MOS transistor S1 is connected with an anode of a diode D1 and a cathode of a diode D3 of a first bridge arm of a rectification bridge. A drain (D) of a MOS transistor S2 serves as the other input end, and the drain (D) of the MOS transistor S2 is connected with an anode of a diode D2 and a cathode of a diode D4 of a second bridge arm of the rectification bridge. A source of the MOS transistor S1 is connected with a source of the MOS transistor S2. A cathode of the diode D1 is connected with a cathode of the diode D2 and a positive end of a capacitor C which may serve as a positive end of the output, and an anode of the diode D3 is connected with an anode of the diode D4 and a negative end of the capacitor C which may serve as a negative end of the output.

Figure 7:
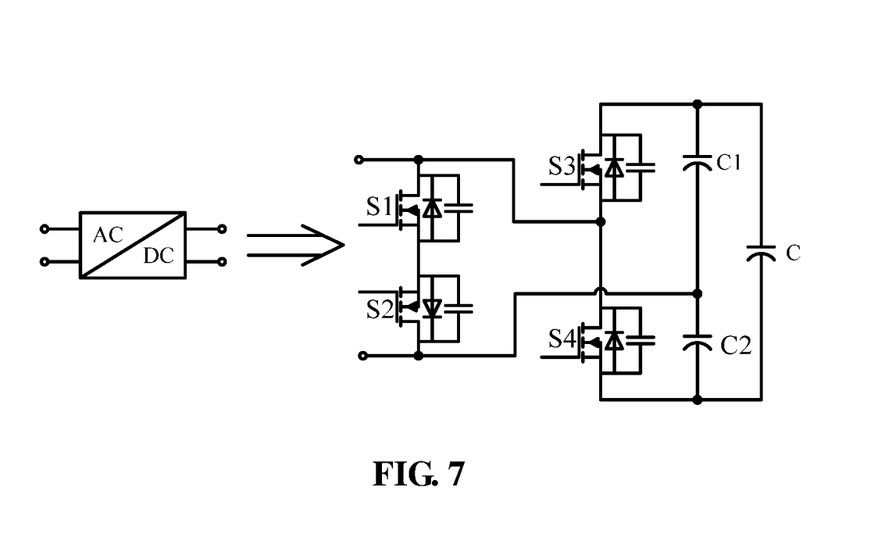
FIG. 7 is a schematic diagram four of a structure of a non-isolated AC-DC conversion subunit according to an embodiment of the present disclosure.

When the non-isolated AC-DC conversion subunit is specifically a bidirectional switch H-bridge circuit conversion subunit, another example of a specific structure of the non-isolated AC-DC conversion subunit is shown in FIG. 7. A drain (D) of a MOS transistor S1 and a drain (D) of a MOS transistor S2 respectively serve as two input ends. A source (S) of the MOS transistor S1 is connected with a source (S) of the MOS transistor S2. The drain (D) of the S1 is connected with a source (S) of a MOS transistor S3 and a drain (D) of a MOS transistor S4. The drain (D) of the MOS transistor S2 is connected with a negative end of a capacitor C1 and a positive end of a capacitor C2. A drain (D) of the MOS transistor S3 is connected with a positive end of the capacitor C1 and a positive end of a capacitor C which may serve as a positive end of the output. A source (S) of the MOS transistor S4 is connected with a negative end of the capacitor C2 and a negative end of the capacitor C which may serve as a negative end of the output.

Figure 8:
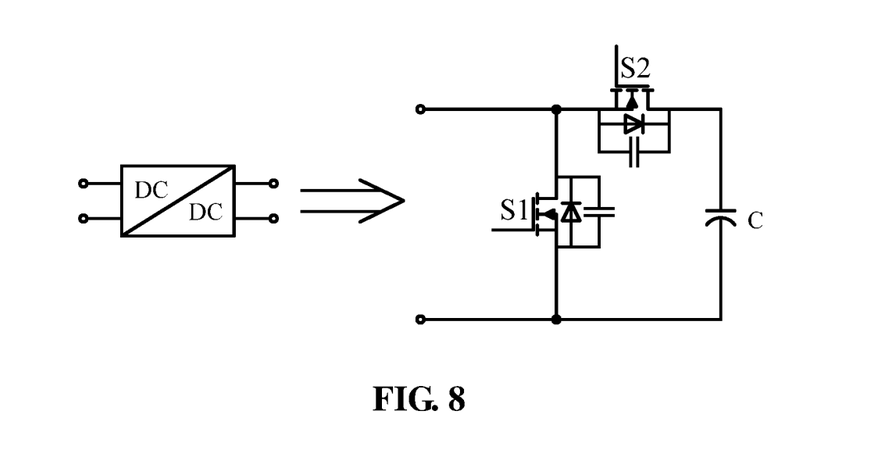
FIG. 8 is a schematic diagram one of a structure of a non-isolated DC-DC conversion subunit according to an embodiment of the present disclosure.

The non-isolated DC-DC conversion subunit in FIG. 3 may specifically be a half-bridge circuit conversion subunit, and one example of a specific structure of the non-isolated DC-DC conversion subunit is shown in FIG. 8. The non-isolated DC-DC conversion subunit may include two MOS transistors S1 and S2, and an output filter capacitor C. A drain (D) of a MOS transistor S1 and a source (S) of a MOS transistor S2 serve as one input end. A drain (D) of the MOS transistor S2 is connected with a positive end of the output filter capacitor C which may serve as a positive end of the output, and a source (S) of the MOS transistor S1 is connected with a negative end of the output filter capacitor C which may serve as a negative end of the output.

Figure 9:
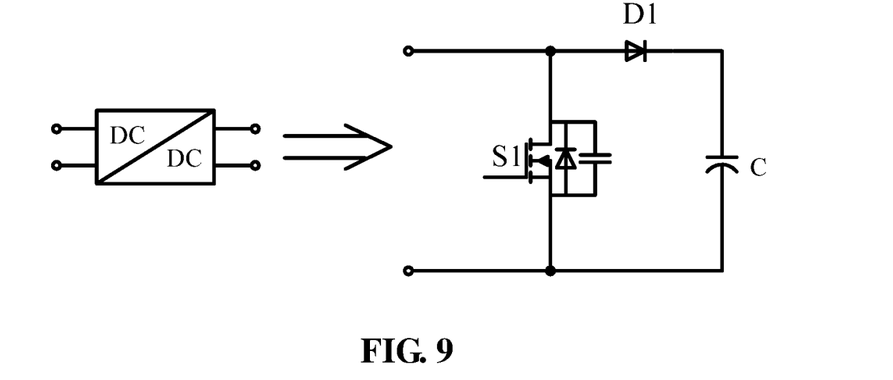
FIG. 9 is a schematic diagram two of a structure of a non-isolated DC-DC conversion subunit according to an embodiment of the present disclosure.

The non-isolated DC-DC conversion subunit in FIG. 3 may specifically be a half bridge (boost converter) circuit conversion subunit, another example of a specific structure of the non-isolated DC-DC conversion subunit is shown in FIG. 9. Differences in FIG. 9 from FIG. 8 are in that: the MOS transistor S2 in FIG. 8 is replaced with a diode D1, a drain of a MOS transistor S1 is connected with an anode of the diode D1, a cathode of the diode D1 is connected with a positive end of an output filter capacitor C which may serve as a positive end of the output, and the other connection manners are the same as those in FIG. 8.

Figure 10:
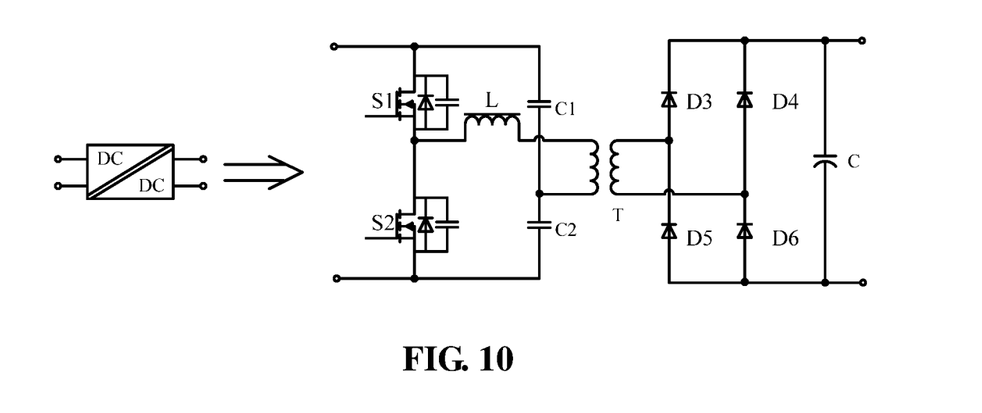
FIG. 10 is a schematic diagram one of a structure of an isolated DC-DC conversion subunit according to an embodiment of the present disclosure.

The isolated DC-DC conversion subunit in FIG. 3 may specifically be an LLC half-bridge circuit conversion subunit or an LLC full-bridge circuit conversion subunit. When the isolated DC-DC conversion subunit is the LLC half-bridge circuit conversion subunit, one example of a specific structure of the isolated DC-DC conversion subunit is shown in FIG. 10. A drain (D) of a MOS transistor S1 is connected with one end of a capacitor C1 which may serve as one input end, and a source (S) of a MOS transistor S2 is connected with one end of a capacitor C2 which may serve as the other input end. A source (S) of the MOS transistor S1 is connected with a drain (D) of the MOS transistor S2 and one end of an inductor L, the other end of the inductor L is connected with one end of a primary side of a transformer T, and the other end of the primary side of the transformer T is connected with the other end of the capacitor C1 and the other end of the capacitor C2. One end of a secondary side of the transformer T is connected with an anode of a diode D3 and a cathode of a diode D5, and the diodes D3 and D5 are connected in series to form a rectification bridge arm. The other end of the secondary side of the transformer T is connected with an anode of a diode D4 and a cathode of a diode D6, and the diodes D4 and D6 are connected in series to form another rectification bridge arm. A cathode of the diode D3 is connected with a cathode of the diode D4 and a positive end of an output filter capacitor C which may serve as a positive end of an output voltage, and an anode of the diode D5 is connected with an anode of the diode D6 and a negative end of the output filter capacitor C which may serve as a negative end of the output voltage.

Figure 11:
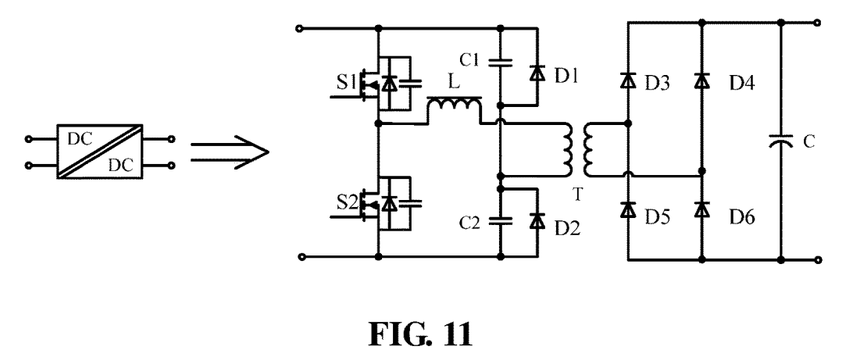
FIG. 11 is a schematic diagram two of a structure of an isolated DC-DC conversion subunit according to an embodiment of the present disclosure.

When the isolated DC-DC conversion subunit in FIG. 3 may be specifically an LLC half-bridge circuit conversion subunit, and another example of a specific structure of the isolated DC-DC conversion subunit is shown in FIG. 11, which is basically the same as that shown in FIG. 10. The difference just lies in that the capacitors C1 and C2 are respectively added with clamping diodes D1 and D2 in parallel for over-voltage protection.

Figure 12:
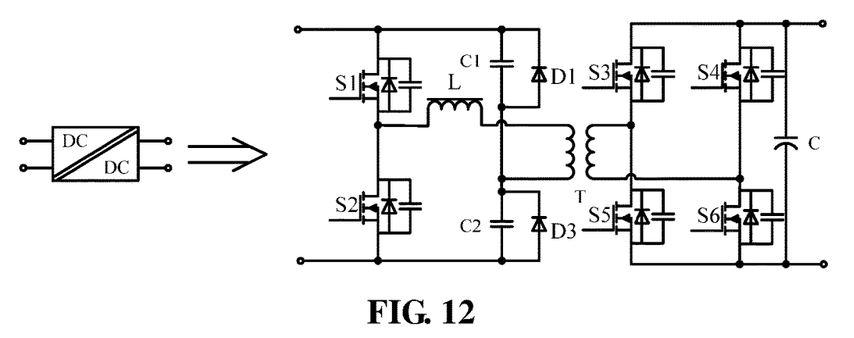
FIG. 12 is a schematic diagram three of a structure of an isolated DC-DC conversion subunit according to an embodiment of the present disclosure.

When the isolated DC-DC conversion subunit in FIG. 3 may be specifically an LLC half-bridge circuit conversion subunit, another example of a specific structure of the isolated DC-DC conversion subunit is shown in FIG. 12. A difference between the circuit shown in FIG. 12 and that in FIG. 11 lies in that the four diodes D3, D4, D5 and D6 on the two rectification bridge arms connected to the secondary side of the transformer T are replaced by MOS transistors S3, S4, S5 and S6.

Figure 13:
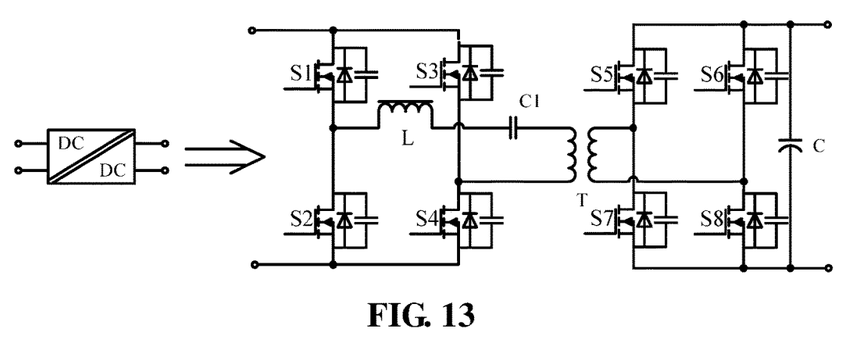
FIG. 13 is a schematic diagram four of a structure of an isolated DC-DC conversion subunit according to an embodiment of the present disclosure.

When the isolated DC-DC conversion subunit in FIG. 3 may be specifically an LLC full bridge circuit conversion subunit, one example of a specific structure of the isolated DC-DC conversion subunit is shown in FIG. 13. A drain (D) of a MOS transistor S1 is connected with a drain (D) of a MOS transistor S3 which may serve as a positive input end, a source of a MOS transistor S2 is connected with a source of a MOS transistor S4 which may serve as a negative input end. A source (S) of the MOS transistor S1 is connected with a drain (D) of the MOS transistor S2 and one end of an inductor L, and the S1 and the S2 are connected in series to form a bridge arm. A source (S) of the MOS transistor S3 is connected with a drain of the MOS transistor S4 and one end of a primary side of a transformer T, the S3 and the S4 are connected in series to form another bridge arm, the other end of the inductor L is connected with one end of a capacitor C1, and the other side of the capacitor C1 is connected with the other end of the primary side of the transformer T, that is, the inductor L, the capacitor C1 and the primary side of the transformer T are connected in series. One end of a secondary side of the transformer T is connected with a source (S) of a MOS transistor S5 and a drain (D) of a MOS transistor S7, and the S5 and the S7 are connected in series to form a bridge arm of an output rectifier. The other end of the secondary side of the transformer T is connected with a source (S) of a MOS transistor S6 and a drain (D) of a MOS transistor S8, and the S6 and the S8 are connected in series to form the other bridge arm of the output rectifier. A drain of the S5 is connected with a drain of the S6 and a positive end of an output filter capacitor C which may serve as a positive end of an output voltage, and a source of the S7 is connected with a source of the S8 and a negative end of the output filter capacitor C which may serve as a negative end of the output voltage.

Figure 14:
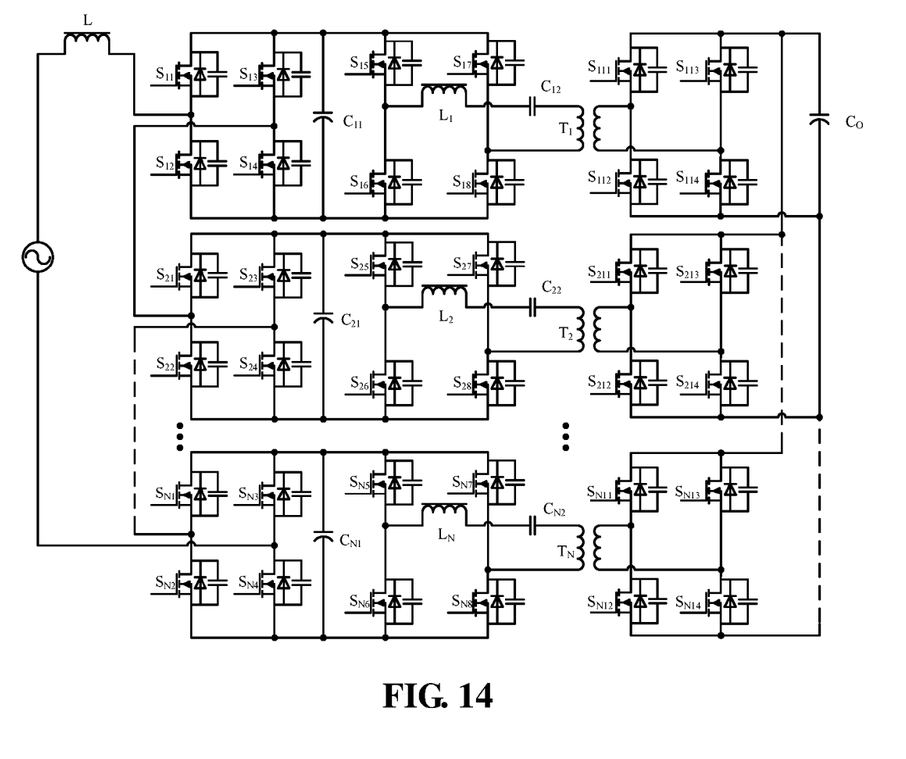
FIG. 14 is a schematic diagram of a structure of a power conversion apparatus composed of a non-isolated AC-DC conversion subunit in FIG. 4 and an isolated DC-DC conversion subunit in FIG. 12.

With reference to FIG. 14, it shows a structure example diagram of a power conversion apparatus formed by connecting non-isolated AC-DC conversion subunits shown in FIG. 5 and isolated DC-DC conversion subunits shown in FIG. 13 in accordance with a connection manner shown in FIG. 3. It should be understood that, based on actual needs, the AC-DC conversion subunit and the DC-DC conversion subunit shown in FIG. 4 to FIG. 13 may be combined and connected in accordance with a connection manner shown in FIG. 2 or FIG. 3 to obtain a power conversion apparatus. These combinations are within a scope of the present disclosure. It should be understood that, the present disclosure is not limited to implementation circuits of AC-DC and DC-DC conversion subunits shown in FIG. 4 to FIG. 13, and in addition to the above AC-DC and DC-DC conversion subunits employing several circuit principles, AC-DC and DC-DC conversion subunits employing other circuit principles are also within the scope of the present disclosure.

Figure 15:
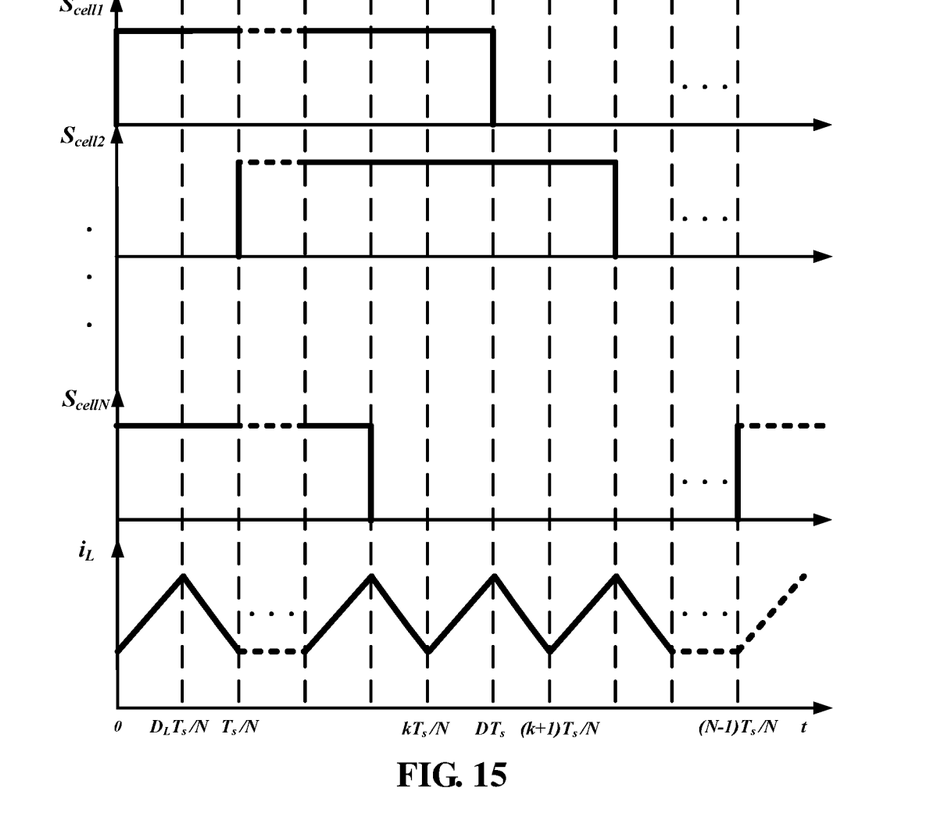
FIG. 15 is a schematic diagram of a structure of an AC-DC control timing sequence and an inductive current waveform according to an embodiment of the present disclosure.

With reference to FIG. 15, it shows a control timing sequence and an inductor current waveform of an AC-DC conversion subunit. Scell1, Scell2, . . . ScellN in FIG. 15 are control waveforms of the corresponding AC-DC conversion subunits in FIG. 2, and iL is an inductor current waveform.

In an example two of the embodiment, each of the power conversion units includes a third conversion subunit, two output ends of the third conversion subunits of the power conversion units are respectively connected in parallel. Input ends of the third conversion subunits of the power conversion units are sequentially connected in series, and one input end of a third conversion subunit of the first power conversion unit and one input end of a third conversion subunit of the last power conversion unit are respectively connected with two ends of the alternating-current power supply.

Figure 16:
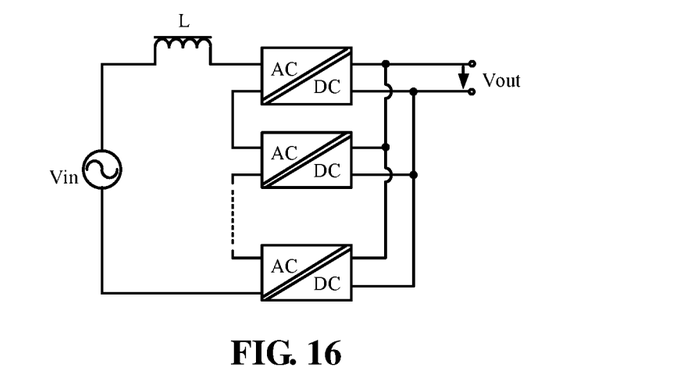
FIG. 16 is a schematic diagram four of a structure of a power conversion apparatus according to an embodiment of the present disclosure.

In the example two, the input end of the third conversion subunit of the first power conversion unit is connected with the alternating-current power supply through the boost unit. In an embodiment, the third conversion subunit may be an isolated AC-DC conversion subunit. With reference to FIG. 16, the power conversion apparatus shown in FIG. 16 employs a monopolar isolated AC-DC conversion subunit and is composed of an input alternating-current power supply, a boost inductor L and isolated AC-DC conversion subunits. One end of the input alternating-current power supply is connected with one end of the boost inductor L, the other end of the boost inductor L is connected with one input end of a first monopolar isolated AC-DC conversion subunit, the other input end of the first monopolar isolated AC-DC conversion subunit is connected with one input end of a second monopolar isolated AC-DC conversion subunit, and so on, the other input end of a $(N-1)^{th}$ monopolar isolated AC-DC conversion subunit is connected with one input end of an $N^{th}$ monopolar isolated AC-DC conversion subunit, and the other input end of the $N^{th}$ monopolar isolated AC-DC conversion subunit is connected with the other end of the input alternating-current power supply. That is to say, inputs of the N monopolar isolated AC-DC conversion subunits are connected in series, and outputs of the N converters monopolar isolated AC-DC conversion subunits are connected in parallel.

The boost unit in the above examples and embodiments is illustrated by using one boost inductor as an example. It should be understood that the boost inductor in the present disclosure may also be divided into two or more inductors connecting in series in an input loop.

The foregoing is a detailed description of the present disclosure in conjunction with specific implementation manners, and it should not be considered that the specific implementation of the present disclosure is limited to these descriptions.

INDUSTRIAL APPLICABILITY

As described above, the power conversion apparatus and the setting method of the power conversion apparatus provided by the embodiments of the present disclosure have the following beneficial effects. The voltage stress and the current stress on the switching device may be 1/n times those of the existing power conversion apparatus, so that switching and conduction losses may be reduced. Under the same ripple condition, an input inductance of a PFC unit is significantly reduced, thereby reducing the volume of the inductor and increasing the power density. Meanwhile, the structure also makes the power conversion apparatus of the present disclosure have an automatic current sharing function and control on the power conversion apparatus be relatively simple and reliable.

What is claimed is:
1. A power conversion apparatus, comprising:
a booster and at least two power converters, wherein each of the at least two power converters includes two input ends and two output ends;
an input end of the booster is configured to be connected with one end of an alternating-current power supply, and an output end of the booster is connected with one input end of a first power converter of the at least two power converters;

one input end of a last power converter of the at least two power converters is configured to be connected with the other end of the alternating-current power supply; and the input ends of the at least two power converters are connected in series, and the output ends of the at least two power converters are connected in parallel;

wherein each of the power converters comprises a first conversion subunit and a second conversion subunit respectively with two input ends and two output ends; the first conversion subunit including a non-isolated alternating current-direct current conversion subunit, and the non-isolated alternating current-direct current conversion subunit including a bidirectional switch H-bridge circuit conversion subunit which comprises a first metal oxide semiconductor (MOS) transistor, a second MOS transistor, a third MOS transistor, a fourth MOS transistor, a first capacitor, a second capacitor and a third capacitor;

a drain of the first MOS transistor and a drain of the second MOS transistor respectively serve as two input ends of the bidirectional switch H-bridge circuit conversion subunit;

a source of the first MOS transistor is connected with a source of the second MOS transistor, the drain of the first MOS transistor is connected with a source of the third MOS transistor and a drain of the fourth MOS transistor;

the drain of the second MOS transistor is connected with a negative end of the first capacitor and a positive end of the second capacitor;

a drain of the third MOS transistor is connected with a positive end of the first capacitor and a positive end of the third capacitor configured to serve as a positive end of the output of the bidirectional switch H-bridge circuit conversion subunit; and a source of the fourth MOS transistor is connected with a negative end of the second capacitor and a negative end of the third capacitor configured to serve as a negative end of the output of the bidirectional switch H-bridge circuit conversion subunit.

2. The power conversion apparatus according to claim 1, wherein the two output ends of the first conversion subunit of each power converter are respectively connected with the two input ends of the second conversion subunit;

the two output ends of the second conversion subunits of the power converters are respectively connected in parallel; and the input ends of the first conversion subunits of the power converters are sequentially connected in series; one input end of the first conversion subunit of the first power converter is connected with the output end of the booster; and one input end of the first conversion subunit of the last power converter is configured to be connected with the other end of the alternating-current power supply.

3. The power conversion apparatus according to claim 2, wherein the second conversion subunit includes an isolated DC-DC conversion subunit.

4. The power conversion apparatus according to claim 3, wherein each of the power converters comprises a third conversion subunit, and two output ends of the third conversion subunits of the power converters are respectively connected in parallel; and input ends of the third conversion subunits of the power converters are sequentially connected in series; one input end of the third conversion subunit of the first power converter is connected with the output end of the booster; and one input end of the third conversion subunit of the last power converter is configured to be connected with the other end of the alternating-current power supply.

5. The power conversion apparatus according to claim 4, wherein the third conversion subunit includes an isolated AC-DC conversion subunit.

6. The power conversion apparatus according to claim 3, wherein the booster comprises at least one inductor.

7. The power conversion apparatus according to claim 3, wherein each of the power converters comprises a third conversion subunit, and two output ends of the third conversion subunits of the power converters are respectively connected in parallel; and input ends of the third conversion subunits of the power converters are sequentially connected in series; one input end of the third conversion subunit of the first power converter is connected with the output end of the booster; and one input end of the third conversion subunit of the last power converter is configured to be connected with the other end of the alternating-current power supply.

8. The power conversion apparatus according to claim 7, wherein the third conversion subunit includes an isolated AC-DC conversion subunit.

9. The power conversion apparatus according to claim 3, wherein the booster comprises at least one inductor.

10. The power conversion apparatus according to claim 3, wherein each of the power converters comprises a third conversion subunit, and two output ends of the third conversion subunits of the power converters are respectively connected in parallel; and input ends of the third conversion subunits of the power converters are sequentially connected in series; one input end of the third conversion subunit of the first power converter is connected with the output end of the booster; and one input end of the third conversion subunit of the last power converter is configured to be connected with the other end of the alternating-current power supply.

11. The power conversion apparatus according to claim 3, wherein the booster comprises at least one inductor.

12. The power conversion apparatus according to claim 2, wherein each of the power converters comprises a third conversion subunit, and two output ends of the third conversion subunits of the power converters are respectively connected in parallel; and input ends of the third conversion subunits of the power converters are sequentially connected in series; one input end of the third conversion subunit of the first power converter is configured to be connected with the output end of the booster; and one input end of the third conversion subunit of the last power converter is configured to be connected with the other end of the alternating-current power supply.

13. The power conversion apparatus according to claim 12, wherein the third conversion subunit includes an isolated AC-DC conversion subunit.

14. The power conversion apparatus according to claim 2, wherein the booster comprises at least one inductor.

15. The power conversion apparatus according to claim 1, wherein each of the power converters comprises a third conversion subunit, and two output ends of the third conversion subunits of the power converters are respectively connected in parallel; and input ends of the third conversion subunits of the power converters are sequentially connected in series; one input end of the third conversion subunit of the first power converter is connected with the output end of the booster; and one input end of the third conversion subunit of the last power converter is configured to be connected with the other end of the alternating-current power supply.

16. The power conversion apparatus according to claim 15, wherein the third conversion subunit includes an isolated AC-DC conversion subunit.

17. The power conversion apparatus according to claim 1, wherein the booster comprises at least one inductor.

18. A method for configuring a power conversion apparatus, the power conversion apparatus comprising a booster and at least two power converters, each of the power converters including two input ends and two output ends, and the method comprising:
  connecting an input end of the booster with one end of an alternating-current power supply, and connecting an output end of the booster with one input end of a first power converter of the at least two power converters;
  connecting one input end of a last power converter of the at least two power converters with the other end of the alternating-current power supply; and
  connecting the input ends of the at least two power converters in series and the output ends of the at least two power converters in parallel;
  wherein each of the power converters comprises a first conversion subunit and a second conversion subunit respectively with two input ends and two output ends; the first conversion subunit including a non-isolated alternating current-direct current conversion subunit, and the non-isolated alternating current-direct current conversion subunit including a bidirectional switch H-bridge circuit conversion subunit which comprises a first metal oxide semiconductor (MOS) transistor, a second MOS transistor, a third MOS transistor, a fourth MOS transistor, a first capacitor, a second capacitor and a third capacitor;
  a drain of the first MOS transistor and a drain of the second MOS transistor respectively serve as two input ends of the bidirectional switch H-bridge circuit conversion subunit;
  a source of the first MOS transistor is connected with a source of the second MOS transistor, the drain of the first MOS transistor is connected with a source of the third MOS transistor and a drain of the fourth MOS transistor;
  the drain of the second MOS transistor is connected with a negative end of the first capacitor and a positive end of the second capacitor;
  a drain of the third MOS transistor is connected with a positive end of the first capacitor and a positive end of the third capacitor configured to serve as a positive end of the output of the bidirectional switch H-bridge circuit conversion subunit; and
  a source of the fourth MOS transistor is connected with a negative end of the second capacitor and a negative end of the third capacitor configured to serve as a negative end of the output of the bidirectional switch H-bridge circuit conversion subunit.

* * * * *

UNITED STATES PATENT AND TRADEMARK OFFICE
CERTIFICATE OF CORRECTION

PATENT NO. : 10,284,093 B2
APPLICATION NO. : 15/739442
DATED : May 7, 2019
INVENTOR(S) : Jie Fan et al.

Page 1 of 1

It is certified that error appears in the above-identified patent and that said Letters Patent is hereby corrected as shown below:

In the Specification

In Column 10 at Line 28, Before "monopolar" delete "*converters*".

Signed and Sealed this
Twenty-fourth Day of September, 2019

Andrei Iancu
*Director of the United States Patent and Trademark Office*